(12) United States Patent
Prabhakar

(10) Patent No.: US 10,967,321 B2
(45) Date of Patent: Apr. 6, 2021

(54) AIR FILTER CLOG DETECTOR

(71) Applicant: Shashidhar Prabhakar, San Jose, CA (US)

(72) Inventor: Shashidhar Prabhakar, San Jose, CA (US)

(*) Notice: Subject to any disclaimer, the term of this patent is extended or adjusted under 35 U.S.C. 154(b) by 234 days.

(21) Appl. No.: 16/176,216

(22) Filed: Oct. 31, 2018

(65) Prior Publication Data

US 2019/0134550 A1 May 9, 2019

Related U.S. Application Data

(60) Provisional application No. 62/581,760, filed on Nov. 5, 2017.

(51) Int. Cl.
| | |
|---|---|
| *B01D 46/00* | (2006.01) |
| *B01D 46/10* | (2006.01) |
| *B01D 46/02* | (2006.01) |

(52) U.S. Cl.
CPC .......... *B01D 46/0086* (2013.01); *B01D 46/02* (2013.01); *B01D 46/10* (2013.01); *B01D 2273/18* (2013.01)

(58) Field of Classification Search
CPC . B01D 46/0086; B01D 2273/18; B01D 46/10
See application file for complete search history.

(56) References Cited

U.S. PATENT DOCUMENTS

| | | | | |
|---|---|---|---|---|
| 3,985,528 A | * | 10/1976 | Revell | B01D 46/18 55/352 |
| 4,304,492 A | * | 12/1981 | Fox | B01D 46/0005 250/573 |
| 5,141,309 A | * | 8/1992 | Worwag | A47L 9/19 356/72 |
| 5,205,156 A | | 4/1993 | Asano et al. | |
| 5,351,035 A | | 9/1994 | Chrisco | |
| 5,668,535 A | | 9/1997 | Hendrix et al. | |
| 5,681,988 A | | 10/1997 | Koch et al. | |
| 5,828,458 A | * | 10/1998 | Taylor | G01N 21/532 356/440 |
| 5,850,183 A | | 12/1998 | Berry, III | |
| 6,040,777 A | | 3/2000 | Ammann et al. | |
| 6,107,923 A | | 8/2000 | Christol | |
| 6,161,417 A | | 12/2000 | Nepsund | |
| 6,307,466 B1 | | 10/2001 | Ferris | |
| 6,320,513 B1 | | 11/2001 | Timmons, Jr. | |
| 6,338,279 B1 | | 1/2002 | Tsataros | |
| 6,448,896 B1 | | 9/2002 | Bankus et al. | |

(Continued)

*Primary Examiner* — Robert Clemente
(74) *Attorney, Agent, or Firm* — Hamilton, Brook, Smith & Reynolds, P.C.

(57) ABSTRACT

An air filter clog detector that provides a simpler and reliable method of determining clogging level of air filters using a grayscale or color light sensor. An example air filter clog detector includes a light source (e.g., light emitting diode (LED)), light detector, and circuitry (e.g., micro-processor controller). The light source is configured to emit light toward an air filter. The light detector is configured to measure a color of light reflected by the air filter. The circuitry is configured to determine whether the air filter is clogged based on the color of light reflected by the air filter. To prevent the air filter clog detector from becoming dirty, the detector can be positioned on the downstream side of the air filter.

19 Claims, 6 Drawing Sheets

(56) References Cited

U.S. PATENT DOCUMENTS

| | | | |
|---|---|---|---|
| 6,507,282 B1 | 1/2003 | Sherwood | |
| 6,993,414 B2 | 1/2006 | Shah | |
| 7,012,685 B1* | 3/2006 | Wilson | B01D 46/0086 |
| | | | 356/239.1 |
| 7,178,410 B2 | 2/2007 | Fraden et al. | |
| 7,261,762 B2 | 8/2007 | Kang et al. | |
| 7,640,077 B2 | 12/2009 | Shah | |
| 7,726,186 B2 | 6/2010 | Nair | |
| 8,314,710 B2 | 11/2012 | Knox et al. | |
| 8,704,672 B2 | 4/2014 | Hoglund et al. | |
| 9,120,043 B2 | 9/2015 | Johansson et al. | |
| 9,183,723 B2 | 11/2015 | Sherman et al. | |
| 9,186,609 B2 | 11/2015 | Sherman et al. | |
| 9,207,727 B2 | 12/2015 | Balough et al. | |
| 9,651,294 B2 | 5/2017 | Kimura et al. | |
| 10,639,577 B1* | 5/2020 | Wilson, Jr. | F24F 11/39 |
| 2003/0052791 A1 | 3/2003 | Reinhardt et al. | |
| 2004/0083895 A1* | 5/2004 | Kim | B01D 46/0086 |
| | | | 96/414 |
| 2010/0313748 A1* | 12/2010 | Schluter | B01D 46/46 |
| | | | 95/25 |
| 2012/0125559 A1* | 5/2012 | Fadell | H04W 4/70 |
| | | | 165/11.2 |
| 2012/0319851 A1 | 12/2012 | Hoglund et al. | |
| 2013/0289919 A1* | 10/2013 | Wilson, Jr. | G01N 21/59 |
| | | | 702/104 |
| 2016/0061747 A1* | 3/2016 | Lee | G01N 21/94 |
| | | | 356/73 |

* cited by examiner

AIR FILTER CLOG DETECTOR

RELATED APPLICATION(S)

This application claims the benefit of U.S. Provisional Application No. 62/581,760, filed on Nov. 5, 2017. The entire teachings of the above application are incorporated herein by reference.

BACKGROUND

Current apparatus for measuring clog levels of air filters range from vane anemometers to pressure differential sensors to light-based systems. These prior devices have so far resulted in fairly bulky and expensive systems, and do not work intuitively, such as mimicking human determinations of clogged filters.

SUMMARY

The air filter clog detector disclosed herein provides a simple and reliable method of determining clog levels of air filters using a grayscale or color light sensor. The air filter clog detector can determine the clog level of a filter by imitating visual inspection of filters.

One example embodiment is an air filter clog detector that includes a light source (e.g., light emitting diode (LED)), light detector, and circuitry (e.g., micro-processor controller). The light source is configured to emit light toward an air filter. The light detector is configured to measure a color of light reflected by the air filter. The circuitry is configured to determine whether the air filter is clogged based on the color of light reflected by the air filter. To prevent the air filter clog detector from becoming dirty, the detector can be positioned on the downstream side of the air filter.

The light detector can be configured to detect grayscale color values, in which case the measured color of light reflected by the air filter can be represented as a value in a range of grayscale color values. Alternatively, the light detector can be configured to detect red-green-blue color values, in which case the measured color of light reflected by the air filter can be represented as a value in a range of red-green-blue color values.

The circuitry can be configured to determine whether the air filter is clogged by comparing the color of light reflected by the air filter with a predetermined color value representing a clogged filter. Alternatively, the circuitry can be configured to determine whether the air filter is clogged based on a difference between the color of light reflected by the air filter and an initial value for the air filter, where the initial value for the air filter represents a clean air filter. In such an embodiment, the circuitry can be configured to determine the initial value based on the color of the filter when it is first installed. As a further alternative, the circuitry can be configured to determine whether the air filter is clogged by comparing the color of light reflected by the air filter with a user-specified color value representing a clogged filter. In such an embodiment, the user-specified color value can be determined based on a selection by a user of an image that, to the user, represents a clogged air filter, where the selected image has a corresponding color value.

The circuitry can be configured to transmit a notification in an event the circuitry determines that the air filter is clogged. The air filter clog detector can include a wireless module configured to transmit the notification to another device, which may be, for example, a thermostat unit, or smart home unit, or router connected to the Internet. The circuitry can further be configured to transmit an order for a replacement filter in an event the circuitry determines that the air filter is clogged.

The air filter clog detector can include a wireless module configured to communicate with the Internet, and the circuitry can be configured to determine whether the air filter is clogged by transmitting information regarding the color of light reflected by the air filter to a remote system for processing. In such an embodiment, the circuitry can be configured to receive a determination from the remote system regarding whether the air filter is clogged. In some embodiments, the circuitry, or remote system, can be configured to learn over time a color value corresponding to an air filter that is clogged based on color values of filters that have been changed.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

When an air filter (e.g., HVAC air filter, automobile engine air filter) becomes sufficiently clogged, it should be changed. New filters are typically white in color, and when they become dirty, the color of the filter typically darkens. This change in color can be used by the air filter clog detector disclosed herein to determine when an air filter is clogged.

When the color of a new air filter is measured with a grayscale/color light sensor, a base value is obtained that can be used to denote a new or clean filter. As the filter is operated, dirt and dust accumulate on the surface of the filter giving it a distinct dirty gray or other color apart from the white color, causing it to become non-white under most circumstances. At this point, the grayscale/color light sensor can provide a value that is different from the value when the filter was white/clean. This visual effect is what humans might use to determine if a filter is dirty. A similar principle is used by the air filter clog detector disclosed herein to distinguish clogged filters from new filters to determine if a filter needs replacing. A grayscale/color light sensor provides a color reading value for white versus gray, so that a "new" versus "used" filter can be discerned.

Figure 1:
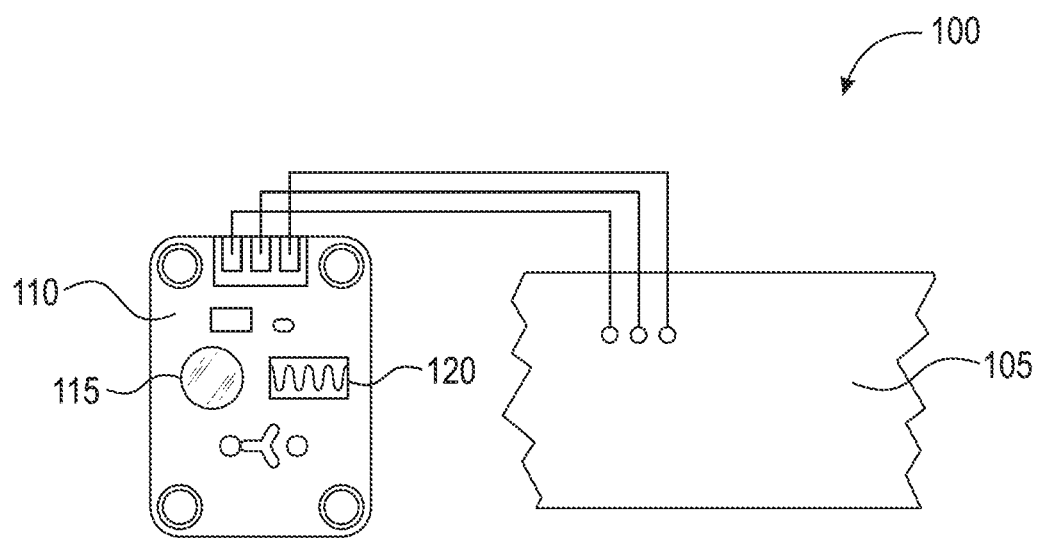
FIG. 1 is a schematic diagram illustrating an air filter clog detector that includes a grayscale/color sensor connected to a microprocessor circuit, according to an example embodiment.

FIG. 1 is a schematic diagram illustrating an air filter clog detector 100 that includes a grayscale/color sensor 110 connected to a microprocessor circuit 105, according to an example embodiment. The sensor 110 includes a light source 115 and a resistance measurement 120 of reflected light that is affected by color/intensity of light. Depending on the configuration of an overall system, the filter can be located ahead of the sensor in case air is being pushed toward distribution (as in the case of cooled or heated or conditioned air moving out of a central furnace, A/C system), or the sensor can be placed ahead of the filter in case air is being pulled into an intake (as in case of air moving toward a central A/C system as gathered from rooms to be cooled or heated).

Figure 2A:
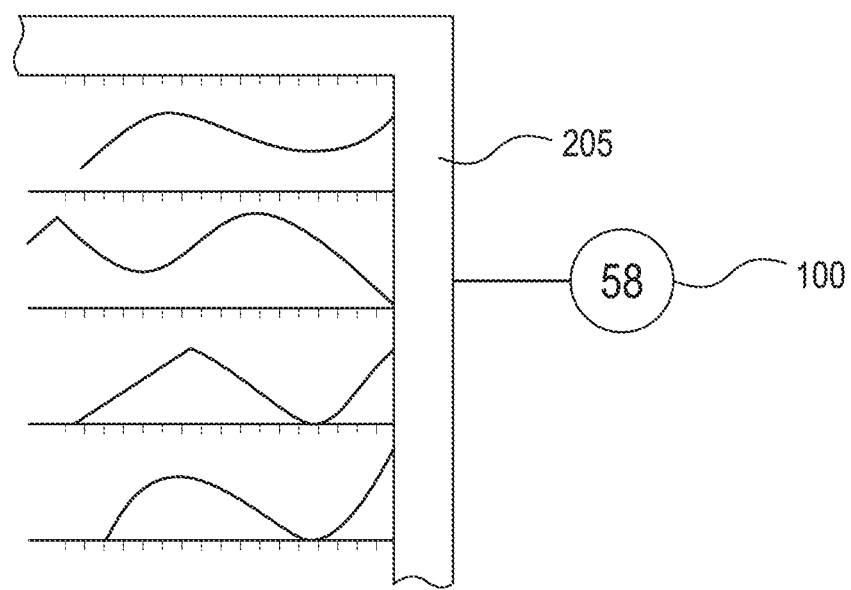
FIG. 2A is a schematic diagram illustrating a new, clean white or light-colored filter being measured by an air filter clog detector, according to an example embodiment.

In an example embodiment, the value provided by the grayscale/color sensor can be used to determine the level of clog by pre-recording the readings at different levels of dirt present on a filter. For example, a white filter can result in a raw reading of about 58 (e.g., on a scale of grayscale or red-green-blue (RGB) color value between 0 and 255; other measurement scales can be used) with the grayscale/color sensor. FIG. 2A is a schematic diagram illustrating a new, clean white or light-colored filter 205 being measured by an air filter clog detector 100. A new/clean filter 205, when measured by a grayscale/color sensor provides a base reading. In this specific case a reading of 58 indicates that this measurement level can be considered clean.

Figure 2B:
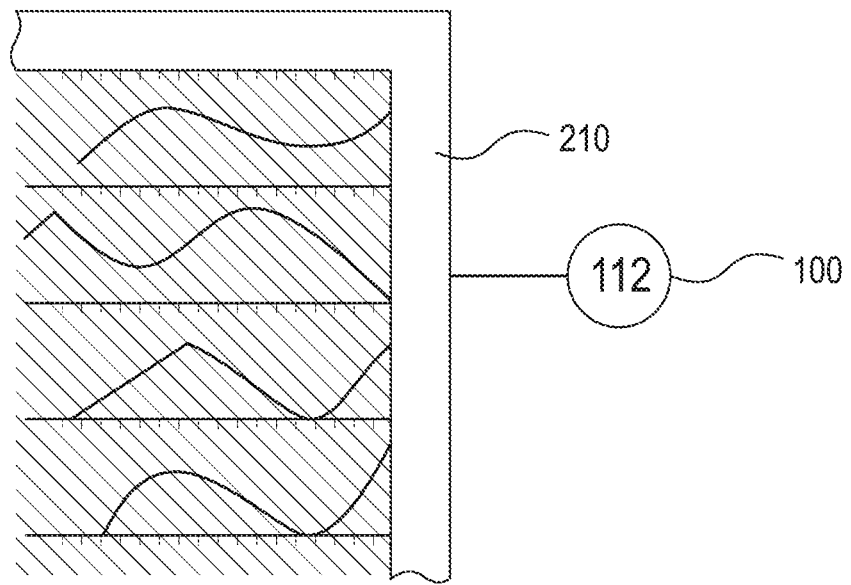
FIG. 2B is a schematic diagram illustrating a clogged, dirty filter being measured by an air filter clog detector, according to an example embodiment.

A dirty air filter may give a reading of 107-112. FIG. 2B is a schematic diagram illustrating a clogged, dirty filter 210 being measured by an air filter clog detector 100. The clogged, dirty filter is no longer the same color of a new, clean filter. Dirt and dust cause the dirty filter to become a darker color, which changes the reading of the grayscale/color sensor. In the specific illustrated example, a reading of around 98 and above is obtained for a dirty filter. This difference in color reading value can be used to determine the level of clog of the filter, and thus, conclude if the filter needs replacing.

An advantage of the disclosed sensor is that it is based on a light source and light detector that are cheap and simple. An example sensor that may be used is a TCS3472 color light-to-digital converter, available from Texas Advanced Optoelectronic Solutions (TAOS). The signal provided by a grayscale or color sensor can be read and interpreted by a microprocessor type circuit (e.g., Arduino, Raspberry Pi). The information from the sensor may be processed by the microprocessor, or by a remote system connected to the Internet (in the "cloud"), to provide a reading to understand the clog level of the filter. This data can be used to perform further actions like ordering a replacement filter and delivering it to the user.

Figure 3:
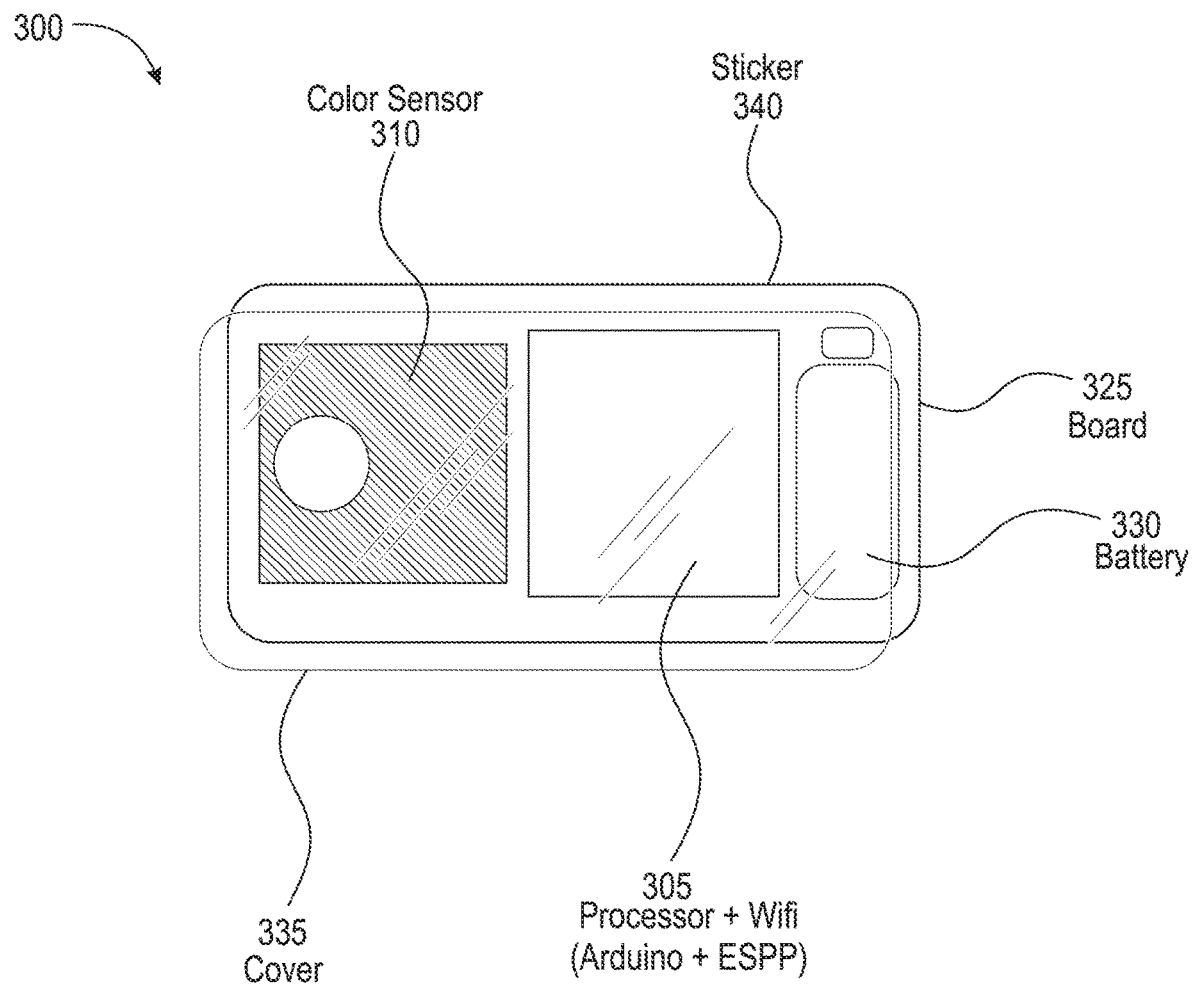
FIG. 3 is a schematic diagram of an air filter clog detector with a color sensor, microprocessor, WiFi (IoT type) connectivity, and power source, according to an example embodiment.

FIG. 3 is a schematic diagram of an air filter clog detector 300 with a color sensor 310, microprocessor and WiFi (e.g., IoT type) module 305, and power source 330 (e.g., battery), according to an example embodiment. The example detector includes a color sensor integrated with a micro controller and WiFi module that communicates a reading to an IoT cloud. Also shown in FIG. 3 is a board 325 on which the components of the detector can be mounted, a protective cover 335, and a sticker 340 for mounting the device. As an alternative to a battery, the device may be hardwired to an HVAC system, for example.

A filter whose clog level is to be determined can first be assigned a clean value with a new filter. This provides a base calibration of sensor for a new filter. It is possible to start from a dirty filter as well, since the color sensor can be directly used to determine a "white" color indicating a new filter. Then, either previously recorded readings from dust clogged filters along with corresponding pictures to match visual expectations, or dust clogged filters based on actual pressure loss determination, can be used to determine a level of clog. Alternately, a predetermined gray color reading can be used to make a replacement decision. This level can then be used by the sensor control circuitry to signal that the filter is clogged. Alternatively, a flexible method includes providing a visual representation of a clogged filter to a user and asking the user what level of clog is considered end of life of the filter. In summary, there are three example ways of utilizing the grayscale color sensor to determine replacement for an air filter. The first is directly interpreting color from the value provided, the second is by using a "calibration" method for each use, and the third is providing a color image with matching value to an user to reach a replacement decision.

Figure 4A:
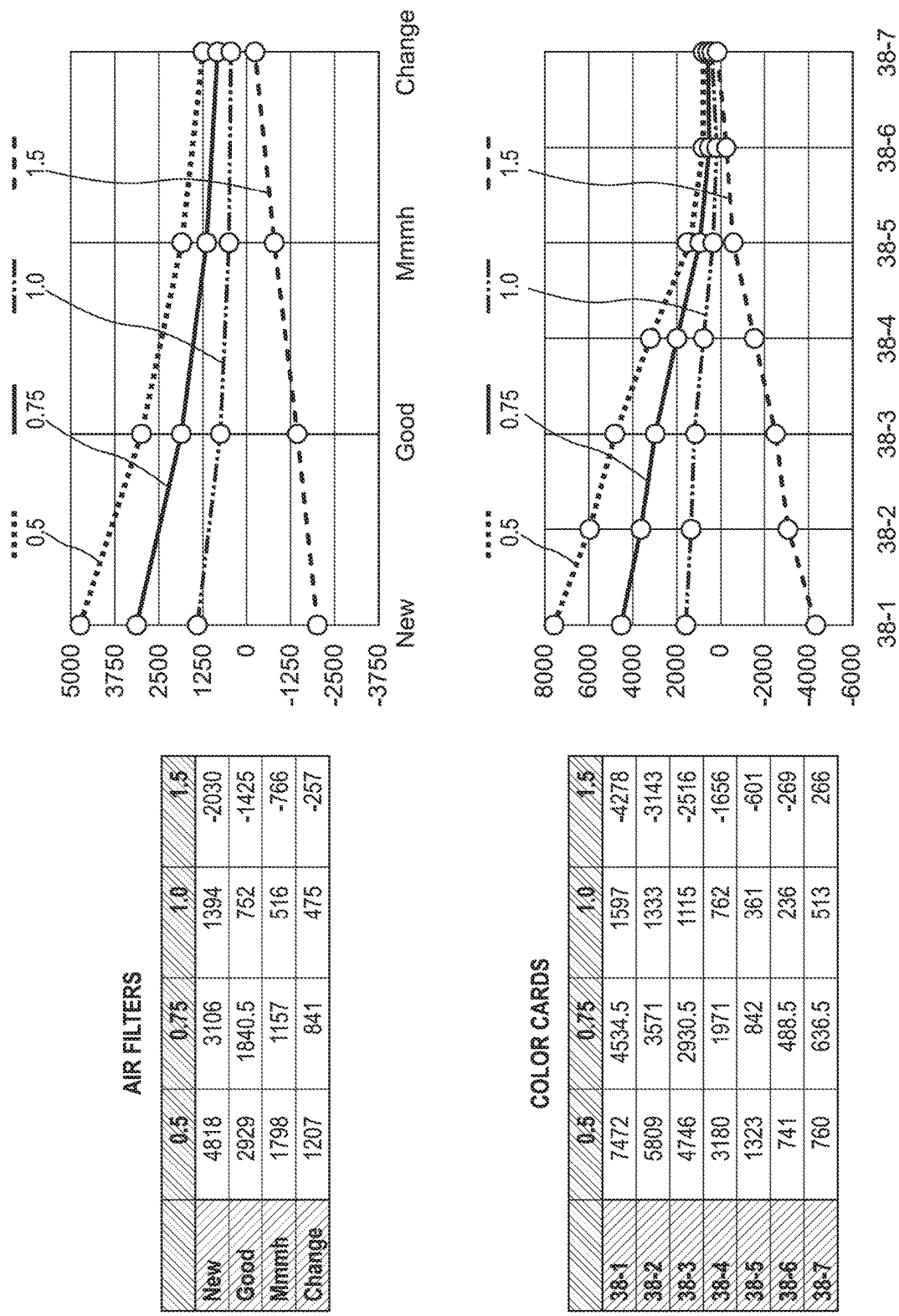
FIGS. 4A and 4B are graphs illustrating an impact of the distance of a color sensor from a target (e.g., air filter surface).
Figure 4B:
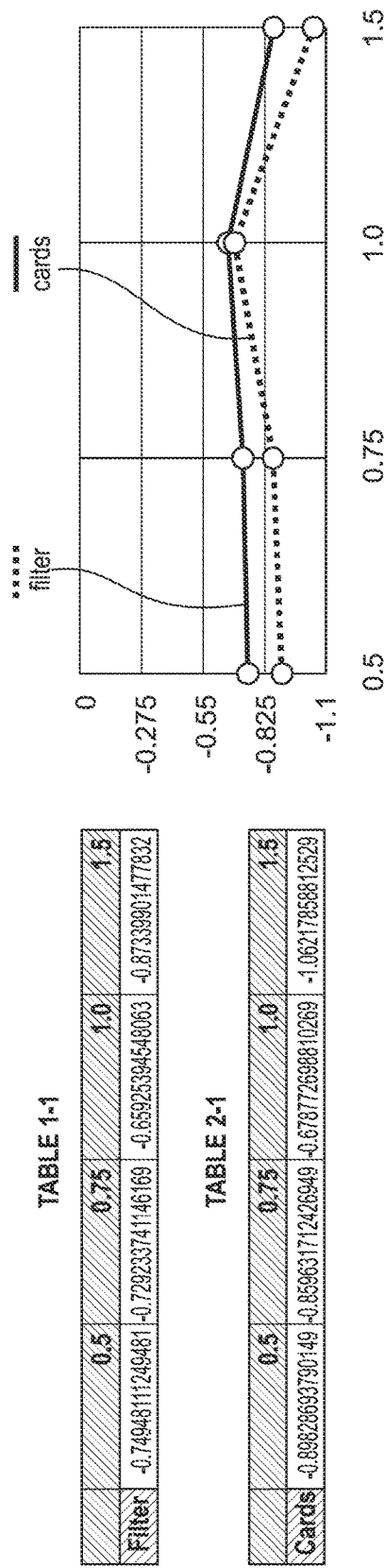
Figure 4B:
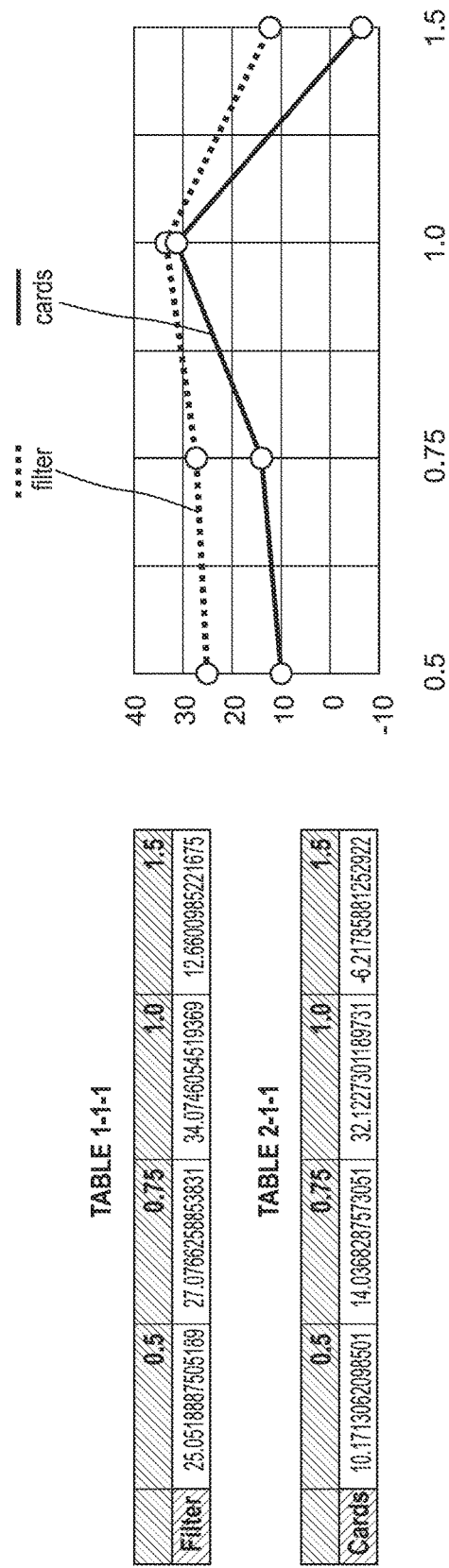

FIGS. 4A and 4B are graphs illustrating an impact of the distance of a sensor from a target (e.g., air filter surface). Color detection values using a color sensor, as disclosed herein, can be impacted by the distance of the sensor from the target. The designs of the embodiments disclosed herein allows the sensor to be about one inch from the target. The graphs show that ¾ inch to one inch is an optimal distance for detection that produces reliable values. However, the change detected by the sensor for clog detection can work with different starting values that converge at a similar point. This allows a two-way relationship to be derived between distance and current value. The slopes of the graphs can determine current distance of the sensor or the stage of clog of the filter. For example, the color cards graph shows values for different colors as determined by the sensor at different distances. All the final "clog" values (3-6, 38-7) converge, which indicates that about a 74% change from an original value is a value that can be considered to indicate a clogged filter.

While example embodiments have been particularly shown and described, it will be understood by those skilled in the art that various changes in form and details may be made therein without departing from the scope of the embodiments encompassed by the appended claims.

What is claimed is:

1. An air filter clog detector comprising:
   a light source configured to emit light toward an air filter;
   a light detector configured to measure a color of light reflected by the air filter; and
   circuitry configured to determine whether the air filter is clogged based on the color of light reflected by the air filter by comparing the color of light reflected by the air filter with a user-specified color value representing a clogged filter.

2. An air filter clog detector as in claim 1 wherein the light detector is configured to detect grayscale color values, wherein and the measured color of light reflected by the air filter is represented as a value in a range of grayscale color values.

3. An air filter clog detector as in claim 1 wherein the light detector is configured to detect red-green-blue color values, and wherein the measured color of light reflected by the air filter is represented as a value in a range of red-green-blue color values.

4. An air filter clog detector as in claim 1 wherein the detector is configured to be positioned on the downstream side of the air filter.

5. An air filter clog detector as in claim 1 wherein the circuitry is further configured to transmit a notification in an event the circuitry determines that the air filter is clogged.

6. An air filter clog detector as in claim 5 further comprising a wireless module configured to transmit the notification to another device.

7. An air filter clog detector as in claim 6 wherein the other device is a router connected to the Internet.

8. An air filter clog detector as in claim 6 wherein the other device is a thermostat unit.

9. An air filter clog detector as in claim 6 wherein the other device is a smart home unit.

10. An air filter clog detector as in claim 1 wherein the circuitry is further configured to transmit an order for a replacement filter in an event the circuitry determines that the air filter is clogged.

11. An air filter clog detector as in claim 1 wherein the circuitry is configured to determine whether the air filter is clogged by comparing the color of light reflected by the air filter with a predetermined color value representing a clogged filter.

12. An air filter clog detector as in claim 1 wherein the circuitry is configured to determine whether the air filter is clogged based on a difference between the color of light reflected by the air filter and an initial value for the air filter, the initial value for the air filter representing a clean air filter.

13. An air filter clog detector as in claim 12 wherein the circuitry is configured to determine the initial value based on the color of the filter when it is first installed.

14. An air filter clog detector as in claim 1 wherein the user-specified color value is determined based on a selection by a user of an image that, to the user, represents a clogged air filter, the selected image having a corresponding color value.

15. An air filter clog detector as in claim 1 wherein the light source is a light emitting diode.

16. An air filter clog detector as in claim 1 wherein the circuitry is a micro-processor controller.

17. An air filter clog detector as in claim 1 comprising:
a light source configured to emit light toward an air filter;
a light detector configured to measure a color of light reflected by the air filter; and
circuitry configured to determine whether the air filter is clogged based on the color of light reflected by the air filter, wherein the circuitry is configured to learn over time a color value corresponding to an air filter that is clogged based on color values of filters that are changed.

18. An air filter clog detector comprising:
a light source configured to emit light toward an air filter;
a light detector configured to measure a color of light reflected by the air filter;
circuitry configured to determine whether the air filter is clogged based on the color of light reflected by the air filter; and
a wireless module configured to communicate with the Internet;
wherein the circuitry is further configured to determine whether the air filter is clogged by transmitting information regarding the color of light reflected by the air filter to a remote system for processing.

19. An air filter clog detector as in claim 18 wherein the circuitry is further configured to receive a determination from the remote system regarding whether the air filter is clogged.

* * * * *

UNITED STATES PATENT AND TRADEMARK OFFICE
CERTIFICATE OF CORRECTION

PATENT NO.        : 10,967,321 B2                                           Page 1 of 1
APPLICATION NO.   : 16/176216
DATED             : April 6, 2021
INVENTOR(S)       : Shashidhar Prabhakar It is certified that error appears in the above-identified patent and that said Letters Patent is hereby corrected as shown below:

In the Claims

In Claim 17, Column 6, Line 5, delete "as in claim 1"

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*